US006177502B1

(12) United States Patent
Hara et al.

(10) Patent No.: US 6,177,502 B1
(45) Date of Patent: Jan. 23, 2001

(54) INJECTION MOLDING COMPOSITIONS, METHOD OF PRODUCING INJECTION-MOLDED ARTICLE THEREOF, AND MATTED INJECTION-MOLDED ARTICLE

(75) Inventors: Masao Hara, Higashihiroshima; Masakatsu Ohsugi, Hiroshima; Yushi Matsuda; Takahiro Tochioka, both of Higashihiroshima; Daisaburo Adachi; Tetsuya Nakata, both of Hiroshima, all of (JP)

(73) Assignee: Mazda Motor Corporation, Hiroshima (JP)

( * ) Notice: Under 35 U.S.C. 154(b), the term of this patent shall be extended for 0 days.

(21) Appl. No.: 09/217,250

(22) Filed: Dec. 21, 1998

(30) Foreign Application Priority Data

Jan. 12, 1998 (JP) .................................................. 10-004063
Sep. 12, 1998 (JP) .................................................. 10-349897

(51) Int. Cl.⁷ ...................................................... C08K 3/00
(52) U.S. Cl. .......................... 524/451; 524/528; 524/529; 524/536; 524/505; 524/425; 525/240
(58) Field of Search ..................................... 524/451, 528, 524/529, 536, 505, 425; 525/240

(56) References Cited

U.S. PATENT DOCUMENTS 5,001,182   3/1991   Maruya et al. .

FOREIGN PATENT DOCUMENTS

| 0 841 376 A1 | 5/1998 | (EP) . |
| 3-87213 | 4/1991 | (JP) . |
| 3-275753 | 12/1991 | (JP) . |
| 4-139252 | 5/1992 | (JP) . |
| 7-053843 | 2/1995 | (JP) . |

OTHER PUBLICATIONS

Database WPI, Section Ch, Week 9121, Derwent Publications, Ltd., London, GB, XP–002100738.

*Primary Examiner*—Edward J. Cain
(74) *Attorney, Agent, or Firm*—Nixon Peabody LLP; Donald R. Studebaker

(57) ABSTRACT

An injection molding composition includes: 100 parts by weight of a propylene-ethylene copolymer comprising a crystalline portion and a non-crystalline portion; and 17 to 33 parts by weight of inorganic particles capable of imparting at least one of rigidity and heat resistance to the propylene-ethylene copolymer. The propylene-ethylene copolymer has a melt flow rate of 15 to 50 g/10 min and a molecular weight distribution (Mw/Mn) of not less than 5. A crystalline ethylene polymer contained in the crystalline portion and a non-crystalline propylene-ethylene copolymer contained in the non-crystalline portion have a total amount ranging from 10 to 20% by weight.

19 Claims, 1 Drawing Sheet

INJECTION MOLDING COMPOSITIONS, METHOD OF PRODUCING INJECTION-MOLDED ARTICLE THEREOF, AND MATTED INJECTION-MOLDED ARTICLE

BACKGROUND OF THE INVENTION

1. Field of the Invention

The present invention relates to an injection molding composition using a propylene block copolymer used in an injection-molded article having high matte feel, a method of producing an injection-molded article thereof, and a matted injection-molded article.

2. Description of the Related Art

A principal method of producing principal interior automotive parts includes, for example, powder slush molding method, vacuum molding method and injection molding method. With the view of enhancing the quality, a powder flush molding method capable of producing parts having high matte feel has hitherto been used in the production of interior materials for high-grade automobile. However, with the view of reducing the cost, it has been increased to use injection-molded articles as parts such as glove rid, meter food and center console in the vicinity of the instrument panel.

However, an injection-molded article of the prior art has gloss better by far than that of a powder slush-molded article, thereby to cause a problem of a difference in gloss between it and the instrument panel made by the powder slush molding method. It has been known that a factor for deciding the gloss of the molded article is surface reflection caused by fine irregularity in the order of $\mu$m on the surface of the molded article and the molded article is matted when this fine irregularity increases. Therefore, a technique capable of forming or providing fine irregularity on the surface of the molded article in the order of $\mu$m is required. In the case of a polypropylene resin which occupies half or more of the amount of the resin used in automotive parts at present, use of which being increased, plate-shaped fine talc particles are used for matting. However, the molded article is not sufficiently roughened only by blending fine talc particles and, therefore, sufficient matte effect is not obtained at present.

Furthermore, a method of matting a molded article by transferring fine roughness on the surface of a mold used in the case of injection molding onto the surface of the molded article is used (Japanese Laid-Open Patent Publication No. 3-87213). However, the molded article is not sufficiently roughened and the same matting as that of the powder slush molding method has never been attained.

SUMMARY OF THE INVENTION

An object of the present invention is to provide an injection molding composition which has the same gloss as that of the molded article obtained by the powder slush molding method, that is, high matte feel, and which can satisfy mechanical characteristics such as processability on injection molding, rigidity and impact resistance, and heat resistance, a method of producing an injection-molded article thereof, and a matted injection-molded article.

The present inventors have intensively studied to solve the above problems. As a result, they have found that, when an injection molding composition including a propylene-ethylene copolymer composition having a melt flow rate, a molecular weight distribution, a content of a crystalline polymer and a content of a non-crystalline polymer, each of them being within a specific range, and inorganic particles in a specific proportion is molded by using a mold having fine surface roughness, an injection-molded article having both high matte feel and good mechanical characteristics and good heat resistance can be obtained by an effective operation such as (1) island like dispersed phase in the copolymer, (2) contained inorganic particles and (3) roughening of the surface caused by transfer of the surface configuration of a mold. Thus, the present invention has been completed.

The injection molding composition according to the present invention preferably includes: 100 parts by weight of a propylene-ethylene copolymer containing a crystalline portion and a non-crystalline portion; and 17 to 33 parts by weight of inorganic particles capable of imparting at least one of rigidity and heat resistance to the propylene-ethylene copolymer. The propylene-ethylene copolymer has a melt flow rate of 15 to 50 g/10 min and a molecular weight distribution (Mw/Mn) of not less than 5. The molecular weight distribution (Mw/Mn) is defined as a ratio of a weight average molecular weight (Mw) to a number average molecular weight (Mn). The crystalline portion contains a crystalline propylene polymer and a crystalline ethylene polymer, the non-crystalline portion contains a non-crystalline propylene-ethylene copolymer. The crystalline ethylene polymer and the non-crystalline propylene-ethylene copolymer have a total amount ranging from 10 to 20% by weight.

The propylene-ethylene copolymer preferably includes a component soluble in n-decane and a component insoluble in n-decane in the fractional thermal dissolution using n-decane. The component insoluble in n-decane is the crystalline portion composed of the crystalline propylene polymer and the crystalline ethylene polymer. On the other hand component soluble in n-decane is the non-crystalline propylene-ethylene copolymer. A molecular weight distribution (Mw/Mn) of the crystalline portion may be within a range from 5 to 7. The content of the crystalline ethylene polymer contained in the crystalline portion may be in the proportion of 2 to 5% by weight based on the propylene-ethylene copolymer, and the content of the non-crystalline propylene-ethylene copolymer in the propylene-ethylene copolymer may be in the proportion of 8 to 15% by weight.

The inorganic particles used in the injection molding composition may contain spherical calcium carbonate particles having an average particle diameter of 1.5 to 15 $\mu$m. The inorganic particles may also contain talc. In that case, a blending ratio of calcium carbonate to talc may be within a range from 3:1 to 1:3. The inorganic particles may also be spherical calcium carbonate particles having an average particle diameter of 1.5 to 15 mm.

To further matte the injection molding composition, at least one elastomer capable of forming an island like dispersed phase, selected from an ethylene-propylene copolymer, an ethylene-propylene group terpolymer, an ethylene-butene copolymer and an olefinic thermoplastic elastomer, can be contained together with the non-crystalline propylene-ethylene copolymer in the amount of 2.5 to 30 parts by weight based on 100 parts by weight in which the non-crystalline propylene-ethylene copolymer is removed from the propylene-ethylene copolymer. The elastomer may be an olefinic thermoplastic elastomer wherein the rubber component is an ethylene-propylene terpolymer and the amount of the rubber component in the elastomer can be from 40 to 60% by weight.

The method of producing the injection-molded article according to the present invention preferably includes the steps of: dispersing inorganic particles capable of imparting at least one of rigidity and heat resistance to a propylene-ethylene copolymer having a melt flow rate of 15 to 50 g/10 min. and a molecular weight distribution Mw/Mn) of not less than 5 in the propylene-ethylene copolymer with melting and therby forming a dispersion; injecting the dispersion into a mold having fine surface roughness wherein a pitch of a cross sectional shape is from 16 to 20 μm and a depth is from 2.0 to 3.0 μm; and solidifying the dispersion under a fixed pressure, thereby to impart surface roughness smaller than that of the fine surface roughness.

The matted injection-molded article according to the present invention includes: the propylene-ethylene copolymer having the melt flow rate of 15 to 50 g/10 min. and the molecular weight distribution (Mw/Mn) of not less than 5 as a matrix; and inorganic particles having the particle diameter of 3 to 15 μm in the matrix in the amount of 10 to 20 parts by weight based on 100 parts by weight of the matrix. The matted injection-molded article is imparted an island like dispersed phase formed by the crystalline ethylene polymer and the non-crystalline propylene-ethylene copolymer contained in the propylene-ethylene copolymer.

BRIEF DESCRIPTION OF THE DRAWINGS

The above and other objects and features of the present invention will become more apparent from the following description of preferred embodiments thereof with reference to the accompanying drawings, throughout which like parts are designed by like reference numerals.

DESCRIPTION OF THE PREFERRED EMBODIMENTS

Figure 1:
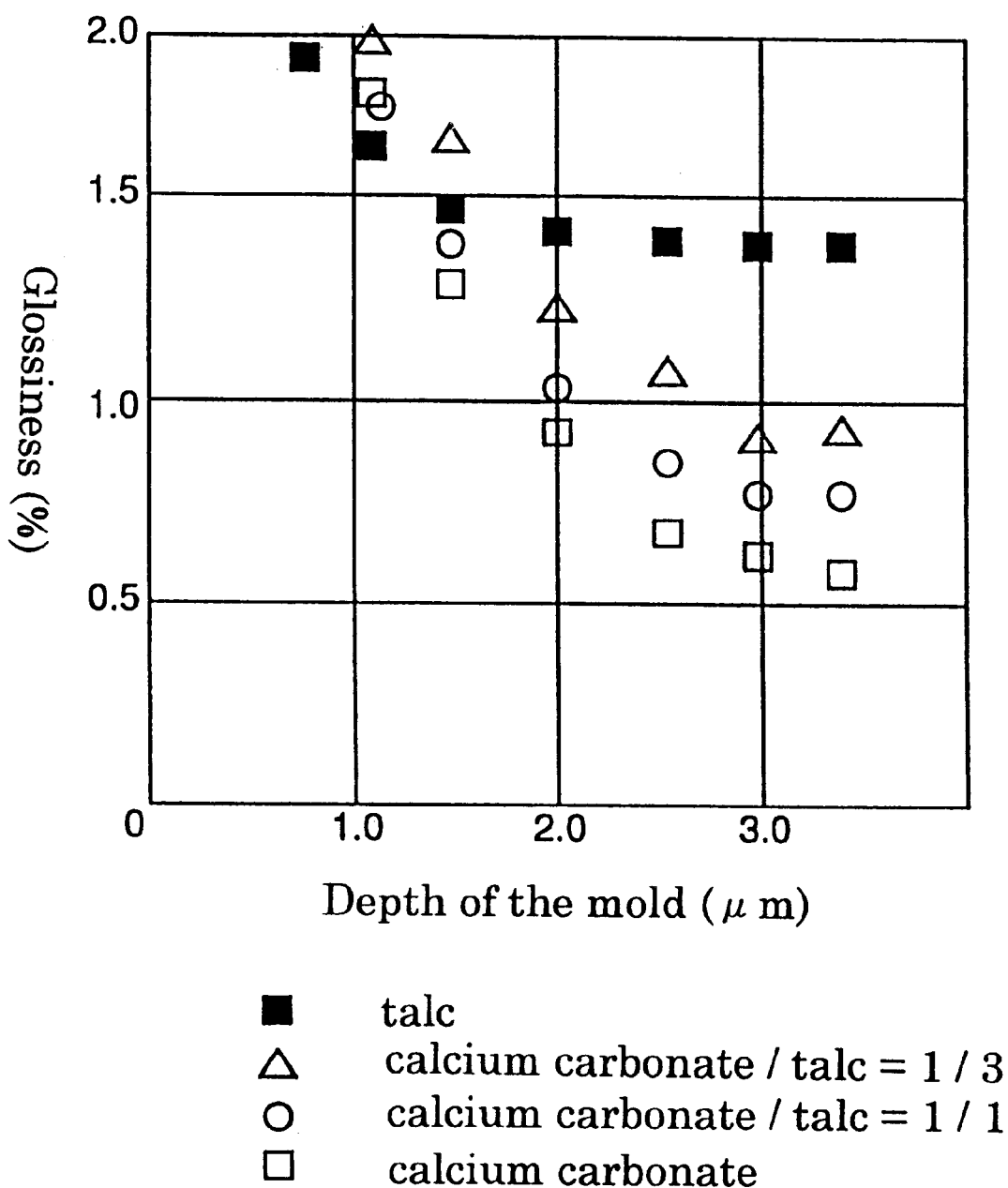
FIG. 1 is a graph showing a relationship between the glossiness of an injection-molded article, the blending ratio of inorganic articles and the depth of a mold.

The entire disclosure of Japanese Patent Application No. 10-004063 filed on Jan. 12, 1998 and No.10-349897 filed on Dec. 9, 1998 including specifications, claims, drawings and summary are incorporated herein by reference in its entirety.

Preferred embodiments of the present invention will be described in detail hereinafter.

It is necessary that the melt flow rate as an index of the average molecular weight of the propylene-ethylene copolymer is within a range from 15 to 50 g/min., and preferably from 10 to 40 g/min. When the melt flow rate is smaller than 15 g/min., the fluidity of the resin is lowered and the resin is not sufficiently diffused on the mold surface and, therefore, transfer of the fine roughness of the mold surface onto the surface of the molded article is hardly performed. On the other hand, when the melt flow rate is larger than 50 g/10 min., the roughening effect by the inorganic particles is not exerted and the impact resistance is also lowered. To enhance the transfer effect without reducing the average-molecular weight, it is effective to enlarge the molecular weight distribution. The molecular weight distribution (Mw/Mn) of the propylene-ethylene copolymer determined by gel permeation chromatography (GPC) is not less than 5, and preferably from 5 to 10. The molecular weight of the crystalline portion as an insoluble component in the fractional thermal dissolution using n-decane is preferably from 5 to 7. The transfer is well performed, and the good rigidity is imparted to the molded article.

The crystalline portion as the component insoluble in n-decane is composed of a crystalline propylene polymer and a crystalline ethylene polymer. When the content of the crystalline polymer exceeds 5% by weight, the impact resistance is lowered. On the other hand, when the content of the crystalline polymer is less than 2% by weight, matte effect is hardly exerted. Therefore, the content is preferably from 2 to 5% by weight. Furthermore, the content of the non-crystalline propylene-ethylene copolymer as the component soluble in n-decane is preferably from 8 to 15% by weight. When the content of the non-crystalline propylene-ethylene copolymer is less than 8% by weight, matte effect is hardly exerted. On the other hand, when the content of the non-crystalline propylene-ethylene copolymer exceeds 15% by weight, rigidity and heat resistance property of the molded article is lowered. The total amount of the crystalline ethylene polymer and the non-crystalline propylene-ethylene copolymer is from 10 to 20% by weight, and preferably from 13 to 17% by weight. The content of the propylene component in the non-crystalline propylene-ethylene copolymer is preferably from 49 to 51% by weight to impart the good impact resistance to the molded article.

The crystalline ethylene polymer and non-crystalline propylene-ethylene copolymer are normally blended in the polymerization step for the purpose of improving the impact resistance of the crystalline propylene polymer.

In addition to the purpose of improving the impact resistance of the crystalline propylene copolymer, the present inventors have paid attention to the fact that a microphase-separated structure formed by the presence of the crystalline ethylene polymer and non-crystalline propylene-ethylene copolymer, specifically, an island like dispersed phase having a diameter of about 0.1 to 1 μm is formed and, according to the present invention, this island like dispersed phase is utilized as a scattered substance contributing to roughening of the surface of the molded article and internal diffusion of reflected light at the surface layer portion of the molded article. In this case, when the total amount of the components and is smaller than 10% by weight, the scattering effect is low and high matte effect can not be obtained. On the other hand, when the total amount is larger than 20% by weight, the rigidity and heat resistance are lowered. To exert high matte effect and to maintain good rigidity and good heat resistance, both components are preferably blended in the amount within a range from 13 to 17% by weight. The weight-average molecular weight of the non-crystalline propylene-ethylene copolymer as the component soluble in n-decane is preferably from 700,000 to 800,000, and the molecular weight distribution is preferably from 5 to 10. Within this range, the resulting island like dispersed phase effectively acts as a scattered substance and a substance for improvement of the impact resistance, which contribute to internal diffusion of reflected light.

As the propylene-ethylene copolymer, for example, there can be used (1) those obtained by applying polymerization processes such as vapor phase process, solution process and the like in the presence of a Ti ionic polymerization catalyst, (2) those prepared by changing the molecular weight of raw materials having smaller melt flow rate and high molecular weight using a heat treatment or melt kneading in the presence of absence of a radical generator (e.g. organic or inorganic peroxide, organotin compound, organoazo compound, etc.) so that the melt flow rate and molecular weight distribution are respectively within the range described in the specification of the present invention, and (3) those prepared by blending crystalline propylene homopolymers and/or propylene-ethylene copolymers having different melt flow rates and molecular weight distributions so that the melt flow rate and molecular weight distribution are respectively within the range described in the specification of the present invention.

The inorganic particles to be blended with the above injection molding composition are preferably in the form close to sphere, and calcium carbonate is particularly preferred. The average particle diameter of the inorganic particles is from 1.5 to 15 $\mu$m, and preferably from 3 to 8 $\mu$m. When the average particle diameter is smaller than 1.5 $\mu$m and is larger than 15 $\mu$m, the gloss increases. The specific surface area is preferably from 6000 to 20000 cm$^2$/g to impart good rigidity and impact resistance to the molded article. The amount of the inorganic particles is from 17 to 33 parts by weight, and preferably from 20 to 30 parts by weight, based on 100 parts by weight of the propylene-ethylene copolymer as the matrix resin. When the amount is smaller than 17 parts by weight, the roughening effect by calcium carbonate is small. On the other hand, even if the amount is larger than 33 parts by weight, the further effect is not recognized and whitening caused by calcium carbonate becomes severe and, at the same time, the impact resistance is drastically lowered, which is not preferred. When talc is used in combination with calcium carbonate, the impact resistance and heat resistance are improved compared with the case of using calcium carbonate alone. In this case, the matte effect is not reduced when the blending ratio of calcium carbonate to talc is within a range from 3:1 to 1:3. The average particle diameter of talc is preferably from 1.6 to 3.0 $\mu$m.

The reason why the matte effect increases by calcium carbonate is considered as follows. That is, in the case of using talc alone, since talc is in the form of a plate, talc has such a property that it is oriented parallel to the surface of the molded article at the surface layer of the molded article by flow of the resin at the time of molding. Accordingly, when talc is exposed to light, the intensity of specular reflected light is stronger than that in the case of bulky or spherical particles. There is also recognized a phenomenon of inhibiting the resin from flowing into a mold having surface roughness wherein the depth of the mold is not less than 2.0 $\mu$m and the pitch is not less than 16 $\mu$L m. This tendency remarkably appears in the case of aiming at a range of the glossiness of not more than 1.4%, and effective matting can not be attained in the case of using talc alone. However, by blending calcium carbonate in the proportion of $\frac{1}{3}$ or more, specular reflected light is reduced and flow of the resin is not inhibited and, therefore, the irregularity by transfer of the resin and irregularity by the inorganic particles synergistically act and roughening of the surface is promoted. As a result, scattered light is increased and low gloss can be obtained.

Furthermore, an elastomer may be blended with the injection molding composition of the present invention to further reduce the gloss. Similar to the case of the crystalline ethylene polymer component and non-crystalline propylene-ethylene polymer component contained in the propylene-ethylene polymer as the matrix, the elastomer contributes to reduction in gloss by forming an island dispersed phase. The elastomer includes, for example, ethylene-propylene copolymer, ethylene-propylene group terpolymer, ethylene-butene copolymer and olefinic thermoplastic elastomer, and it is particularly preferred to use an olefinic thermoplastic elastomer (TPO). The rubber component in TPO is preferably an ethylene-propylene three-dimensional copolymer comprising ethylene, propylene and diene monomers. The molecular weight is not less than 200,000 to form the island like dispersion which is effective to roughing the surface of the molded article and the content in TPO is preferably from 40 to 60% by weight. When the content of the rubber component in TPO is less than 40% by weight, the impact resistance of the molded article is lowered. On the other hand, when the content of the rubber component exceeds 60% by weight, heat resistance property is lowered. The amount of the elastomer, together with the non-crystalline propylene-ethylene copolymer, is not less than 2.5 parts by weight, and preferably from 10 to 20 parts by weight based on 100 parts by weight in which the non-crystalline propylene-ethylene copolymer is removed from the propylene-ethylene copolymer.

The mold used in the method of producing the injection-molded article of the present invention preferably has surface roughness wherein a pitch (P) of a cross sectional shape is from 16 to 20 $\mu$m and a depth (h) is from 2.0 to 3.0 $\mu$m. When the pitch is not more than 16 $\mu$m and the depth is not more than 2.0 $\mu$m, it is impossible to obtain the glossiness of the embossed surface of not more than 1.0%. On the other hand, when the pitch is not less than 20 $\mu$m and the depth is not less than 3.0 $\mu$m, the embossed design is broken and the design property is deteriorated. To provide the surface roughness to the mold, a normal method such as plating, etching and shot blasting used in a surface treatment of the mold can be used, but shot blasting is preferred in the present invention.

The following Examples and Comparative Examples further illustrate the present invention in detail but are not to be construed to limit the scope thereof. Furthermore, the physical properties of the molded articles in the following embodiments were measured by the following manners.

(1) Glossiness of embossed surface
    It was measured according to JIS K-7105.
(2) Izod impact strength
    It was measured according to JIS K-7110.
(3) Flexural modulus
    It was measured according to JIS K-7203.
(4) Thermal deformation temperature
    It was measured according to JIS K-7207.

The results of the measurement of the physical properties of the propylene-ethylene copolymer and propylene homopolymer used are shown in Table 1.

TABLE 1

| Physical properties of propylene-ethylene copolymer and propylene homopolymer | | | | |
|---|---|---|---|---|
| Kind | MFR (g/10 min.) | Mw/Mn | A (% by weight) | B (% by weight) |
| P-1 | 25 | 6.6 | 4.4 | 15 |
| P-2 | 22 | 5.3 | 0 | 0 |
| P-3 | 21 | 3.8 | <2 | 0 |

A: crystalline ethylene polymer
B: non-crystalline propylene-ethylene copolymer

Both of the propylene-ethylene copolymer and propylene homopolymer used are commercially available.

P-1 (propylene-ethylene copolymer): J743F manufactured by Grand Polymer Co., Ltd.

P-2 (propylene homopolymer): J800 manufactured by Grand Polymer Co., Ltd.

P-3 (propylene homopolymer): J2003G manufactured by Idemitsu Petrochemical Co., Ltd.

Example 1

Using a propylene-ethylene copolymer P-1 shown in Table 1 as a matrix, 20 parts by weight of inorganic particles were blended with 80 parts by weight of P-1. Then, a molded article was made by molding at a barrel temperature of 210° C. and a mold temperature of 40° C. using a mold having a different surface roughness and an injection molding machine manufactured by Toshiba Machine Co., Ltd. The physical properties of the resulting molded article were measured. As the inorganic particles, calcium carbonate and talc were used and the blending ratio of calcium carbonate to talc was 1:0, 3:1, 1:1 or 1:3. As calcium carbonate and talc, Whiten P-50 (average particle diameter: 3.17 μm) manufactured by Shiraishi Industries Co., Ltd. and Hi-filler #12 (average particle diameter: 3.0 μm) manufactured by Matsumura Sangyo Co., Ltd. were used, respectively. The relationship between the glossiness of the molded article, the depth of the mold, and the blending ratio of inorganic particles is shown in FIG. 1. Furthermore, the blending ratio and values of physical properties of the molded articles No.1 to No.4 produced by using a mold having a mold depth of 2.5 μm are shown in Table 1 and Table 2, respectively.

Comparative Example 1

According to the same manner as that described in Example 1 except for using only talc as the inorganic particles, a molded article was made (No.5 in Table 2).

In the case of using talc alone, even if the depth of the mold was adjusted to 2.0 g m, the glossiness was not reduced to 1.40% or less. On the other hand, when the blending ratio of calcium carbonate to talc is from 1:0, 1:1 or 1:3, by adjusting the depth of the mold to 2.0 μm or more, the glossiness is drastically lowered compared with the case of using talc alone to obtain the glossiness close to the target lower limit in accordance with the powder slush molding method, or the glossiness of 1.0% or less. The glossiness is lowered as the blending ratio of calcium carbonate becomes larger. In the case of using calcium carbonate alone, the lowest glossiness 0.6% was obtained. However, when the depth of the mold is adjusted to 3.0 μm or more, the effect of lowering the glossiness is not exerted and the irregularity obtained by transferring the mold is large and, therefore, it becomes possible to visually recognize the irregularity as a pattern, resulting in breakage of the embossed design.

The values of the physical properties of the molded articles having different blending ratios of the inorganic particles are shown in No. 1 to No. 4 in Table 2. In any case, the glossiness could be reduced with maintaining the same mechanical characteristics and heat resistance as those of the Comparative Examples.

TABLE 2

Blending ratio of molding material

| | Kind | Propylene-ethylene copolymer or propylene homopolymer (Parts by weight) | Elastomer (Parts by weight) | Inorganic particles calcium carbonate/talc (Parts by weight) |
|---|---|---|---|---|
| Example 1 | P-1 | 80 | 0 | 20/0 |
| Example 2 | P-1 | 80 | 0 | 15/5 |
| Example 3 | P-1 | 80 | 0 | 10/10 |
| Example 4 | P-1 | 80 | 0 | 5/15 |
| Comp. Example 5 | P-1 | 80 | 0 | 0/20 |
| Comp. Example 6 | P-2 | 80 | 0 | 20/0 |
| Comp. Example 7 | P-3 | 80 | 0 | 20/0 |
| Example 8 | P-1 | 80 | 2.5 | 15/5 |
| Example 9 | P-1 | 80 | 5 | 15/5 |

Comparative Example 2

According to the same manner as that described in Example 1 except for using a polypropylene homopolymer, which does not contain a crystalline ethylene polymer component and a non-crystalline propylene-ethylene copolymer component, in place of the propylene-ethylene copolymer as a matrix, a molded article was made by using a mold having a mold depth of 2.5 μm. The results are shown in No. 6 and No. 7 in Table 2. In both cases of No.6 using P-2 and No.7 using P-2, the value of the glossiness was larger than that of No. 1 and the matte effect was inferior to No. 1.

Example 2

According to the same manner as that described in Example 1 except for adding TPO, Milastomer 5030N manufactured by Mitsui Chemicals Co., Ltd. as the elastomer, a molded article was made by using a mold having a mold depth of 2.5 μm. The results are shown in No. 8 and No. 9 in Table 3. It was possible to reduce the glossiness and to improve the impact resistance by the addition of the elastomer.

TABLE 3

Physical properties of molded article

| | Glossiness (%) | Izod impact strength (kJ/m$^2$) | Flexural modulus (GPa) | Thermal deformation temperature (° C.) |
|---|---|---|---|---|
| Example 1 | 0.7 | 3.7 | 1.4 | 109.8 |
| Example 2 | 0.7 | 3.9 | 1.7 | 117 |
| Example 3 | 0.8 | 5.0 | 1.7 | 116 |
| Example 4 | 1.1 | 5.3 | 1.65 | 130 |
| Example 8 | 0.6 | 7.0 | 1.62 | 115 |
| Example 9 | 0.6 | 8.1 | 1.60 | 113 |
| Comp. Example 5 | 1.4 | 3.9 | 1.90 | 135 |
| Comp. Example 6 | 1.4 | 2.5 | 1.7 | 120 |
| Comp. Example 7 | 2.3 | 2.0 | 2.2 | 130 |

According to the injection molding composition and the method of producing the injection-molded article of the present invention, there can be provided an injection-molded article having high matte feel-corresponding to the lower limit of the surface gloss of a powder slush-molded article which could have never been obtained in the injection-molded article of the prior art. Not only the matted injection-molded article obtained by using such composition and production method has high matte feel, but also it is useful as an injection-molded article which is superior in mechanical characteristics such as rigidity and impact resistance, and heat resistance.

What is claimed is:

1. An injection molding composition, comprising:
   100 parts by weight of a propylene-ethylene copolymer containing a crystalline portion and a non-crystalline portion in each molecule of said propylene-ethylene copolymer;
   13 to 17 parts by weight of inorganic particles capable of imparting at least one rigidity and heat resistance to said propylene-ethylene copolymer;
   a sum amount of said crystalline ethylene polymer component and said non-crystalline propylene-ethylene copolymer component being from 10 to 20% by weight based on the whole amount of said propylene-ethylene copolymer; and
   said inorganic particles having an average particles diameter of 1.5 to 15 μm.

2. The composition according to claim 1, wherein said propylene-ethylene copolymer comprises a component soluble in n-decane and a component insoluble in n-decane in the fractional thermal dissolution using n-decane;

said component insoluble in n-decane being a crystalline portion composed of said crystalline propylene polymer component and said crystalline ethylene polymer component; and said component soluble in n-decane being said non-crystalline propylene-ethylene copolymer.

3. The composition according to claim 1, wherein the weight average molecular weight (Mw) of said non-crystalline propylene-ethylene copolymer component is from 700,000 to 800,000, and the molecular weight distribution (Mw/Mn) is within a range from 5 to 10.

4. The composition according to claim 2, wherein the molecular weight distribution (Mw/Mn) of said crystalline portion is within a range from 5 to 7, and said crystalline ethylene polymer component is contained in the proportion of 2 to 5% by weight based on said propylene-ethylene copolymer.

5. The composition according to claim 2, wherein said non-crystalline propylene-ethylene copolymer component is contained in the proportion of 8 to 15% by weight based on said propylene-ethylene copolymer.

6. The composition according to claim 5, wherein at least one elastomer selected from the group consisting of an ethylene-propylene copolymer, an ethylene-propylene group terpolymer, an ethylene-butene copolymer and an olefinic thermoplastic elastomer, is contained together with said non-crystalline propylene-ethylene copolymer in the amount of 2.5 to 300 parts by weight based on 100 parts by weight component in which said non-crystalline propylene-ethylene copolymer component is removed from said propylene-ethylene copolymer.

7. The composition according to claim 6, wherein said elastomer is the olefinic thermoplastic elastomer, in which a rubber component is said ethylene-propylene group terpolymer, and the amount of said rubber component in the elastomer is from 40 to 60% by weight.

8. The composition according to claim 7, wherein said rubber component is said ethylene-propylene group terpolymer comprising ethylene monomer, propylene monomer and diene monomer, the molecular weight of said terpolymer is not less than 200,000, and the amount of said terpolymer in the olefinic thermoplastic elastomer ranges from 40 to 60% by weight.

9. The composition according to claim 1, wherein said inorganic particles comprises spherical calcium carbonate particles having an average particle diameter ranging from 1.5 to 15 µm.

10. The composition according to claim 9, wherein the average particle diameter of said spherical calcium carbonate particles is within a range from 3 to 8 µm.

11. The composition according to claim 9, wherein a specific surface area of said spherical calcium carbonate particles is within a range from 6000 to 20000 cm$^2$/g.

12. The composition according to claim 1, wherein the total amount of said crystalline ethylene polymer and said non-crystalline propylene-ethylene copolymer is within a range from 13 to 15% by weight based on the whole amount of said propylene-ethylene copolymer.

13. The composition according to claim 1, wherein the amount of a propylene component in said non-crystalline propylene-ethylene copolymer is within a range from 49 to 51% by weight based on the whole amount of said propylene-ethylene copolymer.

14. The composition according to claim 1, wherein said composition contains said inorganic particles ranging from 20 to 30 parts by weight per 100 parts by weight of said propylene-ethylene copolymer.

15. The composition according to claim 1, wherein the amount of a propylene component in said non-crystalline propylene-ethylene copolymer component is within a range from 49 to 51% by weight.

16. The composition according to claim 1, wherein said inorganic particles comprises spherical calcium carbonate particles and talc, and a blending ratio of calcium carbonate to talc is within a range from 3:1 to 1:3.

17. The composition according to claim 16, wherein the average particle diameter of said talc is within a range from 1.6 to 3.0 µm.

18. A method of producing an injection-molded article, comprising the steps of:

dispersing inorganic particles capable of imparting at least one of rigidity and heat resistance to a propylene-ethylene copolymer containing a crystalline portion and a non-crystalline portion in each molecule of said propylene-ethylene copolymer and thereby forming a dispersion, said propylene-ethylene copolymer having a melt flow rate of 20 to 40 g/ 10 min, said melt flow rate being measured at 230° C. and also under a load of 2.16 kgf, and a molecular weight distribution (Mw/Mn) of 5 to 10, said molecular weight distribution being defined as a ratio of a weight average molecular weight (Mw) to a number average molecular weight (Mn), said crystalline portion containing a crystalline propylene polymer component and a crystalline ethylene polymer component and said non-crystalline portion containing a non-crystalline propylene-ethylene copolymer component;

injecting said dispersion into a mold having surface roughness wherein a pitch of a cross sectional shape is 16 to 20 µm and a depth is from 2.0 to 3.0 µm; and solidifying said dispersion under a fixed pressure.

19. A matted injection-molded article comprises:

a propylene-ethylene copolymer containing a crystalline portion and a non-crystalline portion in each molecule of said propylene-ethylene copolymer, said propylene-ethylene copolymer having a melt flow rate of 20 to 40 g/10 min, said melt flow rate being measured at 230° C. and also under a load of 2.16 kgf, and a molecular weight distribution (Mw/Mn) of 5 to 10, said molecular weight distribution being defined as a ratio of a weight average molecular weight (Mw) to a number average molecular weight (Mn), said crystalline portion containing a crystalline propylene polymer component and a crystalline ethylene polymer component and said non-crystalline portion containing a non-crystalline propylene-ethylene copolymer component; and inorganic particles having a particle diameter of 1.5 to 15 µm in the matrix in the amount of 17 to 33 parts by weight based on 100 parts by weight of the matrix;

said matted injection-molded article containing a dispersed phase formed by said crystalline portion and said non-crystalline portion contained in said propylene-ethylene copolymer.

\* \* \* \* \*